US012785850B2

(12) United States Patent
Wu et al.

(10) Patent No.: US 12,785,850 B2
(45) Date of Patent: Nov. 3, 2026

(54) ENCODING CONFIGURATION METHOD AND APPARATUS

(71) Applicant: Huawei Technologies Co., Ltd., Shenzhen (CN)

(72) Inventors: Xuming Wu, Wuhan (CN); Chengxian Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 229 days.

(21) Appl. No.: 18/764,801

(22) Filed: Jul. 5, 2024

(65) Prior Publication Data

US 2024/0364448 A1 Oct. 31, 2024

Related U.S. Application Data

(63) Continuation of application No. PCT/CN2022/125641, filed on Oct. 17, 2022.

(30) Foreign Application Priority Data

Jan. 7, 2022 (CN) ......................... 202210015997.2

(51) Int. Cl.

*H04L 1/00* (2006.01)
*H04L 1/22* (2006.01)
*H04Q 11/00* (2006.01)

(52) U.S. Cl.

CPC .............. *H04L 1/0041* (2013.01); *H04L 1/22* (2013.01); *H04Q 11/0067* (2013.01); *H04Q 2011/0081* (2013.01)

(58) Field of Classification Search

None

See application file for complete search history.

(56) References Cited

U.S. PATENT DOCUMENTS 6,522,638 B1 * 2/2003 Haugli ................. H04B 7/1858 370/347
2011/0142437 A1 * 6/2011 Luo ........................ H04B 10/27 398/1

(Continued)

FOREIGN PATENT DOCUMENTS

CN 105122656 B 12/2018
CN 112219363 A 1/2021

(Continued)

OTHER PUBLICATIONS

ITU-T G.9804.2, Series G: Transmission Systems and Media, Digital Systems and Networks, Access networks-Optical line systems for local and access networks, Higher speed passive optical networks—Common transmission convergence layer specification, Sep. 2021, 246 pages.

*Primary Examiner* — Darren E Wolf

(74) *Attorney, Agent, or Firm* — Conley Rose, P.C.

(57) ABSTRACT

An encoding configuration method includes an optical network unit that receives first information, where the first information indicates a change amount of forward error correction codeword information relative to first forward error correction mother code. The optical network unit determines the forward error correction codeword information based on the first information. According to technical solutions provided in this application, the change amount of the forward error correction codeword information relative to the first forward error correction mother code is indicated, to help implement flexible configuration of the forward error correction codeword information.

16 Claims, 5 Drawing Sheets

(56) References Cited

U.S. PATENT DOCUMENTS

| | | | |
|---|---|---|---|
| 2013/0156420 | A1 | 6/2013 | Amitai et al. |
| 2019/0174212 | A1* | 6/2019 | Detwiler ............ H04Q 11/0066 |
| 2020/0382241 | A1 | 12/2020 | Liu et al. |
| 2021/0050939 | A1 | 2/2021 | Wey et al. |
| 2021/0281501 | A1 | 9/2021 | Mahadevan et al. |
| 2021/0297182 | A1 | 9/2021 | Strobel et al. |
| 2022/0123863 | A1* | 4/2022 | Lefevre ............. H03M 13/6362 |
| 2022/0248111 | A1 | 8/2022 | Lefevre et al. |

FOREIGN PATENT DOCUMENTS

| | | | |
|---|---|---|---|
| CN | 112368964 | A | 2/2021 |
| CN | 114374472 | A | 4/2022 |
| CN | 114928429 | A | 8/2022 |
| JP | 2020526111 | A | 8/2020 |
| WO | 2013093993 | A1 | 6/2013 |

* cited by examiner

ENCODING CONFIGURATION METHOD AND APPARATUS

CROSS-REFERENCE TO RELATED APPLICATIONS

This is a continuation of International Patent Application No. PCT/CN2022/125641 filed on Oct. 17, 2022, which claims priority to Chinese Patent Application No. 202210015997.2 filed on Jan. 7, 2022. The disclosures of the aforementioned applications are hereby incorporated by reference in their entireties.

TECHNICAL FIELD

This application relates to the field of optical communication, and more specifically, to an encoding configuration method and an apparatus.

BACKGROUND

In a passive optical network (PON) system, different optical network units (ONUs) have different transmission distances to an optical line termination (OLT) or different optical network units pass through different optical splitters to an optical line termination, resulting in different link losses between the different ONUs and the OLT. Forward error correction (FEC) is used to resolve problems of the link loss and a transmission penalty caused by the optical splitter and optical fiber transmission. In this technology, redundant error correction code may be added to a transmission code column, to greatly reduce optical signal-to-noise ratio (OSNR) tolerance at a receive end, and reduce a bit error rate and a transmit power.

Currently, to ensure transmission performance, a FEC coding manner is defined between the OLT and the ONU based on a largest possible link loss, and a unified FEC coding is used. Generally, in a PON system, a link loss from an ONU to an OLT is large, and a link loss from another ONU to an OLT is small. An ONU with a small link loss does not need FEC coding with a strong error correction capability, but needs to use a same FEC coding manner as that of an ONU with a large link loss. However, such FEC coding generally has large overheads or is complex, resulting in a waste.

Therefore, an encoding configuration method is urgently needed, to implement flexible configuration of forward error correction FEC codeword information.

SUMMARY

This application provides an encoding configuration method and an apparatus, to help implement flexible configuration of forward error correction codeword information.

According to a first aspect, an encoding configuration method is provided. The method includes an optical network unit receives first information, where the first information indicates a change amount of forward error correction codeword information relative to first forward error correction mother code. The optical network unit determines the forward error correction codeword information based on the first information.

According to the technical solution provided in this application, the change amount of the forward error correction codeword information relative to the first forward error correction mother code is indicated, to help implement flexible configuration of the forward error correction codeword information.

With reference to the first aspect, in some implementations of the first aspect, before the receiving first information, the method further includes: The optical network unit sends capability reporting information, where the capability reporting information indicates forward error correction mother code supported by the optical network unit, and the forward error correction mother code supported by the optical network unit includes the first forward error correction mother code.

According to the technical solution provided in this application, an optical line termination determines the first forward error correction mother code from the forward error correction mother code supported by the optical network unit, and can process the first forward error correction mother code, to determine forward error correction codeword information suitable for the optical network unit. Further, codeword information defined in a standard is not required. This helps implement flexible configuration of the forward error correction codeword information.

With reference to the first aspect, in some implementations of the first aspect, before the sending capability reporting information, the method further includes: The optical network unit receives capability query information, where the capability query information is used to query the forward error correction mother code supported by the optical network unit.

With reference to the first aspect, in some other implementations of the first aspect, the first information includes second information. The second information indicates, by using a bit sequence, a change amount of payload information of the forward error correction codeword information relative to payload information of the first forward error correction mother code.

With reference to the first aspect, in some other implementations of the first aspect, the bit sequence of the second information includes a first sequence, and a value of the first sequence is 0, representing that 256 or 128 bits of the first forward error correction mother code corresponding to the first sequence are shortened. In this case, the bit sequence of the second information may further include a second sequence, and a value of the second sequence is 1, representing that 256 or 128 bits of the first forward error correction mother code corresponding to the second sequence are not shortened. Alternatively, the bit sequence of the second information includes a first sequence, and a value corresponding to the first sequence is 1, representing that 256 or 128 bits of the first forward error correction mother code corresponding to the first sequence are shortened. In this case, the bit sequence of the second information may further include a second sequence, and a value of the second sequence is 0, representing that 256 or 128 bits of the first forward error correction mother code corresponding to the second sequence are not shortened.

A bit in the bit sequence corresponds to one column (or a half column) of a mother code matrix, and corresponds to 256 (or 128) bits of mother code information.

With reference to the first aspect, in some other implementations of the first aspect, the first information further includes third information. The third information indicates, by using the bit sequence, a change amount of parity bit information of the forward error correction codeword information relative to parity bit information of the first forward error correction mother code.

With reference to the first aspect, in some other implementations of the first aspect, the bit sequence of the third information includes a third sequence, and a value corresponding to the third sequence is 0, representing that 256 or 128 bits of the first forward error correction mother code corresponding to the third sequence are punctured. In this case, the bit sequence of the third information may further include a fourth sequence, and a value corresponding to the fourth sequence is 1, representing that 256 or 128 bits of the first forward error correction mother code corresponding to the fourth sequence are not punctured. Alternatively, the bit sequence of the third information includes a third sequence, and a value corresponding to the third sequence is 1, representing that 256 or 128 bits of the first forward error correction mother code corresponding to the third sequence are punctured. In this case, the bit sequence of the third information may further include a fourth sequence, and a value corresponding to the fourth sequence is 0, representing that 256 or 128 bits of the first forward error correction mother code corresponding to the fourth sequence are not punctured.

In the technical solution of this application, specific forward error correction codeword information is represented by the bit sequence. The first forward error correction mother code may be processed in a unit of one column or a half column of an encoded matrix to obtain the forward error correction codeword information, to help implement flexible configuration of the forward error correction codeword information.

With reference to the first aspect, in still some implementations of the first aspect, the first information includes a first value, indicating that M bits of the payload information of the first forward error correction mother code are shortened based on a first order, to obtain the payload information of the forward error correction codeword information, and M is obtained by multiplying the first value by 256 or 128.

With reference to the first aspect, in still some implementations of the first aspect, the first information includes a second value, indicating that N bits of the parity bit information of the first forward error correction mother code are punctured based on a second order, to obtain the parity bit information of the forward error correction codeword information, and N is obtained by multiplying the second value by 256 or 128.

In the technical solution of this application, the value represents that a mother code matrix corresponding to the first forward error correction mother code is processed to obtain specific forward error correction codeword information, to help implement flexible configuration of the forward error correction codeword information.

The first order and/or the second order are/is back-to-front or front-to-back.

With reference to the first aspect, in some implementations of the first aspect, the first information further includes fourth information. The fourth information indicates that the first information takes effect.

The first information is carried in a first message. The first message includes at least one of the following: a physical layer operations, administration and maintenance (PLOAM) message, an optical network terminal management and control interface (OMCI) message, and an operations, administration and maintenance (OAM) message.

According to a second aspect, an encoding configuration method is provided. The method includes: An optical line termination determines first information, where the first information indicates a change amount of forward error correction codeword information relative to first forward error correction mother code. The optical line termination sends the first information to an optical network unit, where the first information is used by the optical network unit to determine the forward error correction codeword information.

According to the technical solution provided in this application, the change amount of the forward error correction codeword information relative to the first forward error correction mother code is indicated, to help implement flexible configuration of the forward error correction codeword information.

With reference to the second aspect, in some implementations of the second aspect, before the sending the first information, the method further includes: The optical line termination receives capability reporting information, where the capability reporting information indicates forward error correction mother code supported by the optical network unit, and the forward error correction mother code supported by the optical network unit includes the first forward error correction mother code.

According to the technical solution provided in this application, the optical line termination determines the first forward error correction mother code from the forward error correction mother code supported by the optical network unit, and can process the first forward error correction mother code, to determine forward error correction codeword information suitable for the optical network unit. Further, codeword information defined in a standard is not required. This helps implement flexible configuration of the forward error correction codeword information.

With reference to the second aspect, in some implementations of the second aspect, before the receiving capability reporting information, the method further includes: The optical line termination sends capability query information, where the capability query information is used to query the forward error correction mother code supported by the optical network unit.

With reference to the second aspect, in some other implementations of the second aspect, the first information includes second information. The second information indicates, by using a bit sequence, a change amount of payload information of the forward error correction codeword information relative to payload information of the first forward error correction mother code.

With reference to the second aspect, in some other implementations of the second aspect, the bit sequence of the second information includes a first sequence, and a value of the first sequence is 0, representing that 256 or 128 bits of the first forward error correction mother code corresponding to the first sequence are shortened. In this case, the bit sequence of the second information may further include a second sequence, and a value of the second sequence is 1, representing that 256 or 128 bits of the first forward error correction mother code corresponding to the second sequence are not shortened. Alternatively, the bit sequence of the second information includes a first sequence, and a value corresponding to the first sequence is 1, representing that 256 or 128 bits of the first forward error correction mother code corresponding to the first sequence are shortened. In this case, the bit sequence of the second information may further include a second sequence, and a value of the second sequence is 0, representing that 256 or 128 bits of the first forward error correction mother code corresponding to the second sequence are not shortened.

A bit in the bit sequence corresponds to one column (or a half column) of a mother code matrix, and corresponds to 256 (or 128) bits of mother code information.

With reference to the second aspect, in some other implementations of the second aspect, the first information further includes third information. The third information indicates, by using the bit sequence, a change amount of parity bit information of the forward error correction codeword information relative to parity bit information of the first forward error correction mother code.

With reference to the second aspect, in some other implementations of the second aspect, the bit sequence of the third information includes a third sequence, and a value corresponding to the third sequence is 0, representing that 256 or 128 bits of the first forward error correction mother code corresponding to the third sequence are punctured. In this case, the bit sequence of the third information may further include a fourth sequence, and a value corresponding to the fourth sequence is 1, representing that 256 or 128 bits of the first forward error correction mother code corresponding to the fourth sequence are not punctured. Alternatively, the bit sequence of the third information includes a third sequence, and a value corresponding to the third sequence is 1, representing that 256 or 128 bits of the first forward error correction mother code corresponding to the third sequence are punctured. In this case, the bit sequence of the third information may further include a third sequence, and a value corresponding to the third sequence is 0, representing that 256 or 128 bits of the first forward error correction mother code corresponding to the third sequence are not punctured.

In the technical solution of this application, specific forward error correction codeword information is represented by the bit sequence. The first forward error correction mother code may be processed in a unit of one column or a half column of an encoded matrix to obtain the forward error correction codeword information, to help implement flexible configuration of the forward error correction codeword information.

With reference to the second aspect, in still some implementations of the second aspect, the first information includes a first value, indicating that M bits of the payload information of the first forward error correction mother code are shortened based on a first order, to obtain the payload information of the forward error correction codeword information, and M is obtained by multiplying the first value by 256 or 128.

With reference to the second aspect, in still some implementations of the second aspect, the first information includes a second value, indicating that N bits of the parity bit information of the first forward error correction mother code are punctured based on a second order, to obtain the parity bit information of the forward error correction codeword information, and N is obtained by multiplying the second value by 256 or 128.

In the technical solution of this application, the value represents that a mother code matrix corresponding to the first forward error correction mother code is processed to obtain specific forward error correction codeword information, to help implement flexible configuration of the forward error correction codeword information.

The first order and/or the second order are/is back-to-front or front-to-back.

With reference to the second aspect, in some implementations of the second aspect, the first information further includes fourth information. The fourth information indicates that the first information takes effect.

The first information is carried in a first message. The first message includes at least one of the following: a PLOAM message, an OMCI message, and an OAM message.

According to a third aspect, an encoding configuration apparatus is provided. The apparatus includes: a transceiver unit, configured to receive first information, where the first information indicates a change amount of forward error correction codeword information relative to first forward error correction mother code; and a processing unit, configured to determine the forward error correction codeword information based on the first information.

With reference to the third aspect, in some implementations of the third aspect, the transceiver unit is further configured to send capability reporting information, where the capability reporting information indicates forward error correction mother code supported by an optical network unit, and the forward error correction mother code supported by the optical network unit includes the first forward error correction mother code.

With reference to the third aspect, in some implementations of the third aspect, the transceiver unit is further configured to receive capability query information, where the capability query information is used to query the forward error correction mother code supported by the optical network unit.

According to a fourth aspect, an encoding configuration apparatus is provided. The apparatus includes: a processing unit, configured to determine first information, where the first information indicates a change amount of forward error correction codeword information relative to first forward error correction mother code; and a transceiver unit, configured to send the first information to an optical network unit.

With reference to the fourth aspect, in some implementations of the fourth aspect, the transceiver unit is further configured to receive capability reporting information, where the capability reporting information indicates forward error correction mother code supported by the optical network unit, and the forward error correction mother code supported by the optical network unit includes the first forward error correction mother code.

With reference to the fourth aspect, in some implementations of the fourth aspect, the transceiver unit is further configured to send capability query information, where the capability query information is used to query the forward error correction mother code supported by the optical network unit.

According to a fifth aspect, a communication apparatus is provided, including a processor. The processor is configured to: after being coupled to a memory and reading instructions in the memory, perform the method according to any one of the foregoing aspects based on the instructions. The communication apparatus may be the optical network unit entity in the first aspect, or an apparatus including the optical network unit entity; or the communication apparatus may be the optical line termination entity in the second aspect, or an apparatus including the optical line termination entity.

With reference to the fifth aspect, in a possible implementation, the communication apparatus further includes a memory. The memory is configured to store program instructions and data.

With reference to the fifth aspect, in a possible implementation, the communication apparatus is a chip or a chip system. Optionally, when the communication apparatus is the chip system, the communication apparatus may include a chip, or may include a chip and another discrete device.

According to a sixth aspect, a communication apparatus is provided, including a processor and an interface circuit. The interface circuit is configured to receive a computer program or instructions and transmit the computer program or the instructions to the processor. The processor is configured to execute the computer program or the instructions, so that the communication apparatus performs the method according to the first aspect or the second aspect.

With reference to the sixth aspect, in a possible implementation, the communication apparatus is a chip or a chip system. Optionally, when the apparatus used for charging is the chip system, the apparatus may include a chip, or may include a chip and another discrete device.

According to a seventh aspect, a communication system is provided, including the optical network unit and the optical line termination according to the first aspect and the second aspect.

The optical network unit is configured to perform the method according to the first aspect. The optical line termination is configured to perform the method according to the second aspect.

According to an eighth aspect, a computer program product is provided. The computer program product includes computer program code. When the computer program code is run on a computer, the computer is enabled to perform the methods according to the foregoing aspects.

It should be noted that all or some of the computer program code may be stored in a first storage medium. The first storage medium may be encapsulated together with a processor, or may be encapsulated separately from a processor. This is not specifically limited in this embodiment of this application.

According to a ninth aspect, a computer-readable medium is provided. The computer-readable medium stores program code. When the computer program code is run on a computer, the computer is enabled to perform the methods according to the foregoing aspects.

According to a tenth aspect, a chip system is provided, including a memory and a processor. The memory is configured to store a computer program. The processor is configured to invoke the computer program from the memory and run the computer program, to enable a communication device on which the chip system is installed to perform the method according to any one of the first aspect and the second aspect and the possible implementations thereof.

The chip system may include an input chip or interface configured to send information or data, and an output chip or interface configured to receive information or data.

DESCRIPTION OF EMBODIMENTS

The following describes technical solutions of this application with reference to the accompanying drawings.

With increasing enrichment of telecommunication services, users' demands for bandwidth are also increasing. Carriers in China and around the world have considered fiber to the home (FTTH) as an inevitable choice for an access network. FTTH using a PON system has become a mainstream choice. In a PON network, this access technology enables only passive optical devices such as an optical fiber and an optical splitter to be used between a local end (OLT) and a user (ONU) of the access network, without the need to rent an equipment room or provide a power supply. Therefore, the PON network is referred to as a passive optical network. During data sending and receiving, a broadcast form is used in a downstream direction of the PON network, and a unicast form is used in an upstream direction of the PON network.

Figure 1:
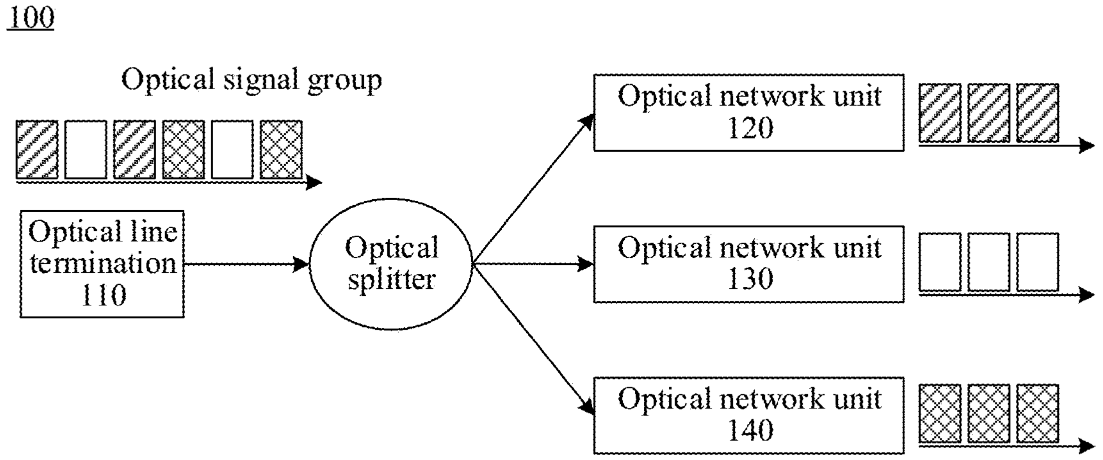
FIG. 1 is a schematic diagram of upstream and downstream transmission in a PON system.

FIG. 1 is a schematic diagram of upstream and downstream transmission in a PON system.

As shown in FIG. 1, during the downstream transmission, one channel of signals delivered by an OLT are split into N channels of signals by using an optical splitter, and the N channels of signals are sent to all ONUs at the same time. The ONU selectively receives downstream data with a same ID as the ONU, and discards other data.

In the upstream direction, N channels of optical signals from the ONU are combined into one optical signal group by using a time division multiplexing (TDM) technology. A principle is that upstream transmission time is divided into several timeslots Ti (i=1, 2, 3, . . . , 32, . . . ). In each timeslot, only one ONU is arranged to send grouping information to the OLT in a grouping manner, and each ONU sequentially sends the grouping information based on an order specified by the OLT. The TDM requires the OLT to measure a distance between the OLT and each ONU and then perform strict sending timing for each ONU. Each ONU obtains timing information from a downstream signal sent by the OLT, and sends an upstream grouping signal in a timeslot specified by the OLT, to avoid a conflict between ONUs. The PON based on the principle is referred to as a time-division multiplexing-passive optical network (TDM-PON).

In the PON system, different ONUs have different transmission distances to the OLT or different ONUs pass through different optical splitters to the OLT, resulting in different link losses between the different ONUs and the OLT. A FEC technology is used to resolve problems of the link loss and a transmission penalty caused by the optical splitter and optical fiber transmission. In this technology, redundant error correction code may be added to a transmission code column, to greatly reduce OSNR tolerance at a receive end, and reduce a bit error rate and a transmit power. In addition, this technology can effectively improve a channel used for optical fiber signal transmission. There are always various types of distortion and unequal latency during signal transmission in media. Final results of a bit error rate and jitter of the signal can be reflected by a system bit error rate. The FEC technology can resolve problems of fiber dispersion, signal attenuation, channel noise, and interference between a plurality of optical fibers in a long-distance, ultra-long-distance, and large-capacity dense wavelength-division multiplexing (DWDM) optical fiber communication system. This greatly reduces performance between systems.

In a 10G PON, Reed-Solomon (RS) coded FEC is used. However, in a 50G PON, a low-density parity check (LDPC) coding manner is selected. Different FEC coding manners have different performance and implementation costs. A complex FEC coding manner can usually bring more coding benefits. For a same coding manner, more overheads can also be introduced to bring more coding benefits.

Currently, to ensure transmission performance, a FEC coding manner is defined between the OLT and the ONU based on a largest possible link loss, and a unified FEC coding is used. Generally, in a PON system, a link loss from an ONU to an OLT is large, and a link loss from another ONU to an OLT is small. An ONU with a small link loss does not need FEC coding with a strong error correction capability, but may need to use a same FEC coding manner as that of an ONU with a large link loss. However, such FEC coding generally has large overheads or is complex, resulting in a waste.

Based on this, this application provides an encoding configuration method and an apparatus, hoping to implement flexible configuration of FEC codeword information. The following describes in detail technical solutions of this application by using an example of interaction between an optical line termination 110 and an optical network unit 120.

Figure 2:
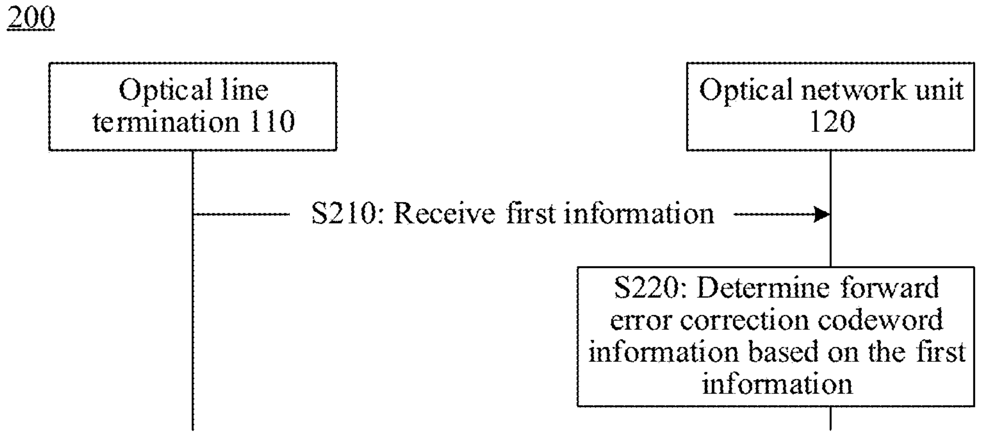
FIG. 2 is a schematic diagram of an encoding configuration method according to an embodiment of this application.

FIG. 2 is a schematic diagram of an encoding configuration method according to an embodiment of this application.

S210: The optical network unit 120 receives first information, where the first information indicates a change amount of forward error correction codeword information relative to first forward error correction mother code.

The first information is determined by the optical line termination 110. The optical line termination 110 may determine forward error correction codeword information suitable for the optical network unit 120 based on signal quality, a transmit power, and the like of the optical network unit 120. In addition, the change amount of the forward error correction codeword information relative to the first forward error correction mother code is indicated in a form of the first information, so that the optical network unit 120 accurately learns of the forward error correction codeword information.

Before receiving the first information, the optical network unit 120 may send capability reporting information to the optical line termination 110, where the capability reporting information indicates forward error correction mother code supported by the optical network unit 120, and the forward error correction mother code supported by the optical network unit 120 includes the first forward error correction mother code.

In this way, the optical line termination 110 determines the first forward error correction mother code from the forward error correction mother code supported by the optical network unit 120, and can process the first forward error correction mother code, to determine the forward error correction codeword information suitable for the optical network unit 120. Further, codeword information defined in a standard is not required. This helps implement flexible configuration of the forward error correction codeword information.

Optionally, before sending the capability reporting information, the optical network unit 120 may receive capability query information sent by the optical line termination 110, where the capability query information is used to query the forward error correction mother code supported by the optical network unit 120.

The first information is carried in a first message. The first message includes at least one of the following: a PLOAM message, an OMCI message, and an OAM message.

S220: The optical network unit 120 determines the forward error correction codeword information based on the first information.

In a possible implementation, the first information may include second information. The second information indicates, by using a bit sequence, a change amount of payload information of the forward error correction codeword information relative to payload information of the first forward error correction mother code.

The bit sequence of the second information includes a first sequence, and a value of the first sequence is 0, representing that 256 or 128 bits of the first forward error correction mother code corresponding to the first sequence are shortened. In this case, the bit sequence of the second information may further include a second sequence, and a value of the second sequence is 1, representing that 256 or 128 bits of the first forward error correction mother code corresponding to the second sequence are not shortened.

Alternatively, the bit sequence of the second information includes a first sequence, and a value corresponding to the first sequence is 1, representing that 256 or 128 bits of the first forward error correction mother code corresponding to the first sequence are shortened. In this case, the bit sequence of the second information may further include a second sequence, and a value of the second sequence is 0, representing that 256 or 128 bits of the first forward error correction mother code corresponding to the second sequence are not shortened.

A bit in the bit sequence corresponds to one column (or a half column) of a mother code matrix, and corresponds to 256 (or 128) bits of mother code information.

Optionally, the first information may further include third information. The third information indicates, by using the bit sequence, a change amount of parity bit information of the forward error correction codeword information relative to parity bit information of the first forward error correction mother code.

The bit sequence of the third information includes a third sequence, and a value corresponding to the third sequence is 0, representing that 256 or 128 bits of the first forward error correction mother code corresponding to the third sequence are punctured. In this case, the bit sequence of the third information may further include a fourth sequence, and a value corresponding to the fourth sequence is 1, representing that 256 or 128 bits of the first forward error correction mother code corresponding to the fourth sequence are not punctured.

Alternatively, the bit sequence of the third information includes a third sequence, and a value corresponding to the third sequence is 1, representing that 256 or 128 bits of the first forward error correction mother code corresponding to the third sequence are punctured. In this case, the bit sequence of the third information may further include a fourth sequence, and a value corresponding to the fourth sequence is 0, representing that 256 or 128 bits of the first forward error correction mother code corresponding to the fourth sequence are not punctured.

In the technical solution of this application, specific forward error correction codeword information is represented by the bit sequence. The first forward error correction mother code may be processed in a unit of one column or a half column of an encoded matrix to obtain the forward error correction codeword information, to help implement flexible configuration of the forward error correction codeword information.

In another possible implementation, the first information may include a first value, indicating that M bits of the payload information of the first forward error correction mother code are shortened based on a first order, to obtain the payload information of the forward error correction codeword information, and M is obtained by multiplying the first value by 256 or 128.

Optionally, the first information may further include a second value, indicating that N bits of the parity bit information of the first forward error correction mother code are punctured based on a second order, to obtain the parity bit information of the forward error correction codeword information, and N is obtained by multiplying the second value by 256 or 128.

The first order and/or the second order are/is back-to-front or front-to-back.

In the technical solution of this application, the value represents that a mother code matrix corresponding to the first forward error correction mother code is processed to obtain specific forward error correction codeword information, to help implement flexible configuration of the forward error correction codeword information.

Optionally, the first information may further include fourth information. The fourth information indicates that the first information takes effect.

According to the technical solution provided in this application, the change amount of the forward error correction codeword information relative to the first forward error correction mother code is indicated, to help implement flexible configuration of the forward error correction codeword information.

Figure 3:
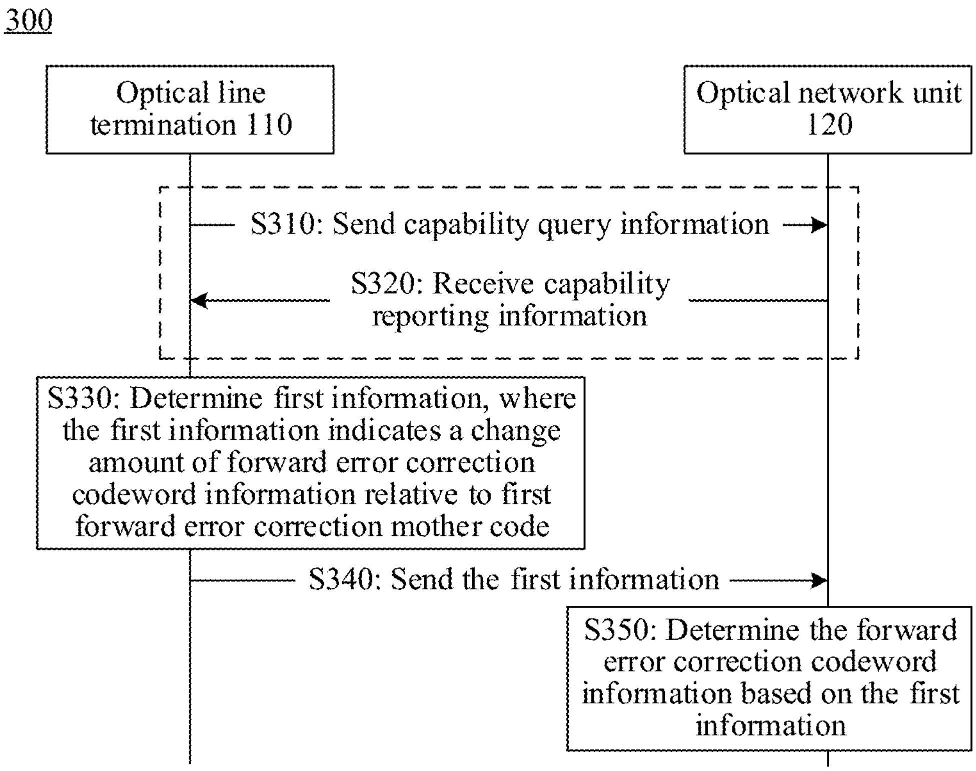
FIG. 3 is a schematic diagram of a specific example of an encoding configuration method according to an embodiment of this application.

FIG. 3 is a schematic diagram of a specific example of an encoding configuration method according to an embodiment of this application.

S310: An optical network unit 120 receives capability query information sent by an optical line termination 110.

The capability query information is used to query forward error correction mother code supported by the optical network unit 120. The capability query information may be carried in a first message. The first message includes at least one of the following: a PLOAM message, an OMCI message, and an OAM message.

By way of example but not limitation, when the capability query information is carried in the PLOAM message, a specific form and content of the capability query information may be shown in the following Table 1. "FEC capability query" in bold represents a type of the forward error correction mother code that is supported by the optical network unit 120 and that is queried or inquired by the optical line termination 110.

TABLE 1

Form and content of capability query information

| Octet | Content | Description |
|---|---|---|
| 1-2 | ONU-ID | Directed message to a particular ONU. |
| 3 | Message type ID | 0x1F, "Set_FEC_Code". |
| 4 | SeqNo | Eight-bit unicast sequence number. |
| 5 | FEC capability query | An octet of the form RRRR RRRS, where: S = 0: Query of FEC code capability. |
| 6-33 | FEC code selection | LDPC codeword encoding. |
| 34-40 | padding | Set to 0x00 by the transmitter; treated as "don't care" by the receiver. |
| 41-48 | MIC | Message integrity check, computed using the default PLOAM_IK in case of broadcast message, and using the ONU-specific derived shared PLOAM_IK in case of directed message. |

S320: The optical network unit 120 sends capability reporting information.

By way of example but not limitation, when the capability reporting information is carried in the PLOAM message, a specific form of the capability reporting information may be shown in the following Table 2 and Table 3. "FEC code Capability" in bold represents a type of the forward error correction mother code supported by the optical network unit 120. In Table 2, the forward error correction mother code supported by the optical network unit 120 includes an LDPC. In Table 3, the optical network unit 120 supports shortening and puncturing of the forward error correction FEC mother code.

TABLE 2

Form and content of capability reporting information

| Octet | Content | Description |
|---|---|---|
| 1-2 | ONU-ID | ONU-ID of the message sender. |
| 3 | Message type ID | 0x1F, "FEC_Capability". |
| 4 | SeqNo | Repeated from downstream Set FEC_Code_message. |
| 5 | FEC Capability | 0x00: Only default FEC code is supported;<br>0x01: The codeword specified in octet 6-33 is supported.<br>Other values reserved by ITU-T. |
| 6-33 | FEC code Capability | LDPC codeword encoding. |
| 34-40 | padding | Set to 0x00 by the transmitter; treated as "don't care" by the receiver. |
| 41-48 | MIC | Message integrity check, computed using the ONU-specific derived shared PLOAM integrity key. |

TABLE 3

Form and content of capability reporting information

| Octet | Content | Description |
|---|---|---|
| 1-2 | ONU-ID | ONU-ID of the message sender. |
| 3 | Message type ID | 0x1E, "FEC_Capability". |
| 4 | SeqNo | Repeated from downstream Set_FEC_Code message. |
| 5 | FEC Capability | 0x00: Only default FEC code is supported;<br>0x01: The codeword specified in octet 6-7 is supported.<br>Other values reserved by ITU-T. |
| 6 | Shortened columns number | Numbers of half column shortened from the back of mother code. |
| 7 | Punctured columns number | Numbers of half column punctured from the back of mother code. |
| 8-40 | padding | Set to 0x00 by the transmitter; treated as "don't care" by the receiver. |
| 41-48 | MIC | Message integrity check, computed using the ONU-specific derived shared PLOAM integrity key. |

S330: The optical line termination 110 determines first information, where the first information indicates a change amount of forward error correction codeword information relative to first forward error correction mother code.

Figure 4:
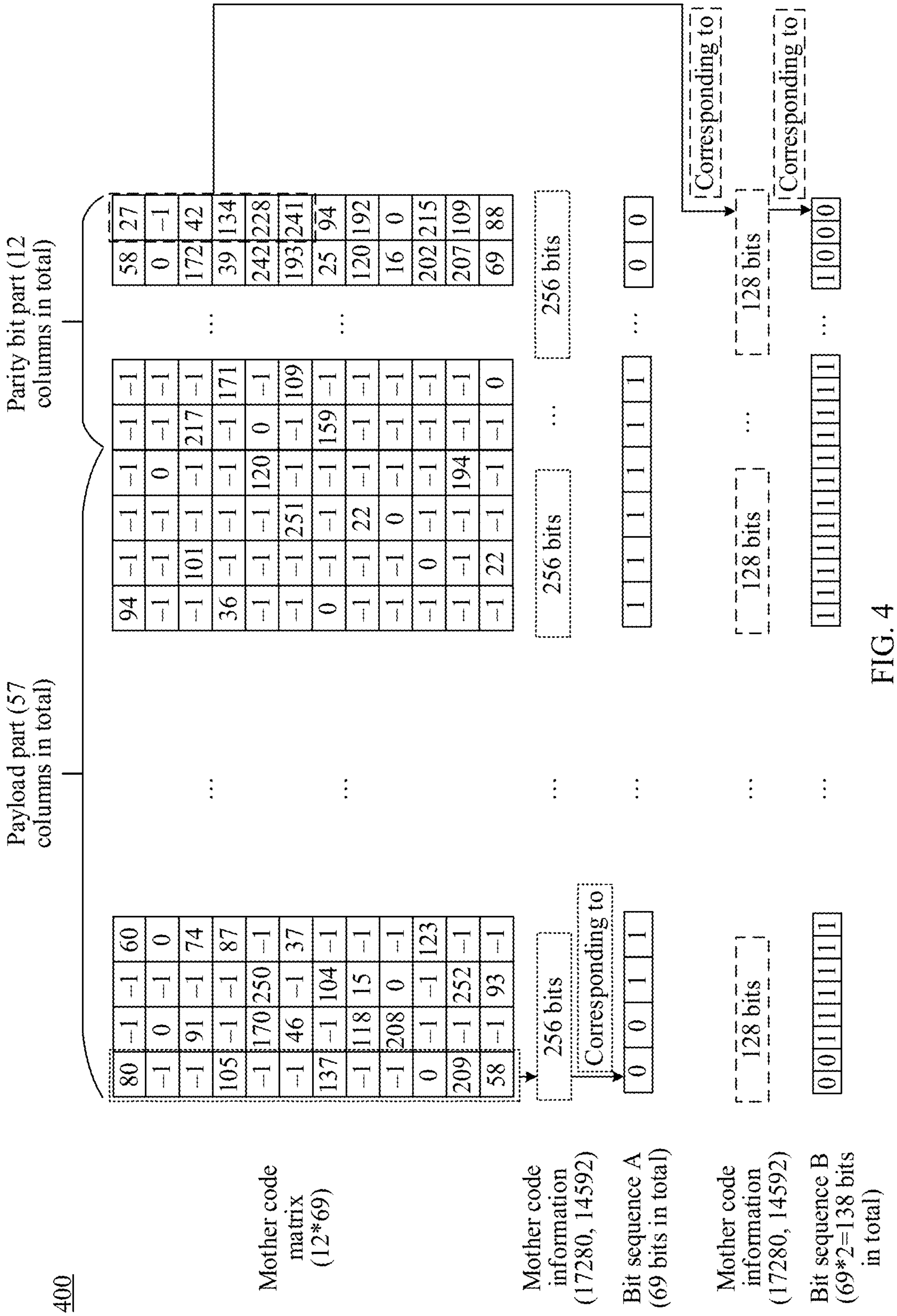
FIG. 4 is a schematic diagram of indicating forward error correction codeword information by using a bit sequence according to an embodiment of this application.

The forward error correction codeword information includes payload information and parity bit information. In this embodiment of this application, the first information may indicate, by using a bit sequence and/or a value, the change amount of the forward error correction codeword information relative to the first forward error correction mother code. A 12*69 encoding matrix is used in a 50G PON. When a new codeword structure is generated based on the encoding matrix, columns of the matrix are generally pruned in a unit of one column or a half column. As shown in FIG. 4, a default codeword LDPC (17280, 14592) uses the first 57 columns and 12 columns of the matrix during encoding. There may be the following four cases based on different content of the first information.

Case 1:

A payload part and a parity bit part of the forward error correction codeword information are indicated by using the bit sequence.

Further, the foregoing first information may include both second information and third information. The second information indicates, by using the bit sequence, a change amount of the payload information of the forward error correction codeword information relative to payload information of the first forward error correction mother code. The third information indicates, by using the bit sequence, a change amount of parity bit information of the forward error correction codeword information relative to parity bit information of the first forward error correction mother code. In this way, the forward error correction codeword information configured for the optical network unit 120 is represented by the bit sequence.

By way of example but not limitation, when the first information is carried in the PLOAM message, a specific form of the first information may be shown in the following Table 4. "FEC capability set" in bold represents that the message is the forward error correction codeword information configured for the optical network unit 120. "FEC code selection" in bold represents that the message includes the bit sequence.

TABLE 4

Form and content of first information in Case 1

| Octet | Content | Description |
|---|---|---|
| 1-2 | ONU-ID | Directed message to a particular ONU. |
| 3 | Message type ID | 0x1F, "Set_FEC_Code". |
| 4 | SeqNo | Eight-bit unicast sequence number. |
| 5 | FEC capability set | An octet of the form RRRR RRRS, where: S = 1: Setting FEC code for upstream transmission |
| 6-33 | FEC code selection | LDPC codeword encoding. |
| 34-40 | padding | Set to 0x00 by the transmitter; treated as "don't care" by the receiver. |
| 41-48 | MIC | Message integrity check, computed using the default PLOAM_IK in case of broadcast message, and using the ONU-specific derived shared PLOAM_IK in case of directed message. |

As shown in FIG. 4, a 12*69 mother code matrix has 69 columns in total, where 57 columns are the payload information, and 12 columns are the parity bit information. For example, the forward error correction codeword information is represented by a bit sequence A. One column of the mother code matrix corresponds to 256 bits of codeword information, and corresponds to one bit of the bit sequence A. The bit sequence A includes a bit sequence A1 and a bit sequence A2. The bit sequence A includes 69 bits, the bit sequence A1 includes 57 bits, and the bit sequence A2 includes 12 bits. The bit sequence A1 represents the change amount of the payload information of the forward error correction codeword information relative to the payload information of the first forward error correction mother code. The bit sequence A2 represents the change amount of the parity bit information of the forward error correction codeword information relative to the parity bit information of the first forward error correction mother code. In other words, the first information is the bit sequence A, the second information is the bit sequence A1, and the third information is the bit sequence A2. The bit sequence A1 includes a first sequence (for example, the first column and the second column), and a value of the first sequence is 0, representing that 256 bits of the first forward error correction mother code corresponding to the first sequence are shortened. In this case, the bit sequence A1 further includes a second sequence (for example, the third column to the 57th column), and a value of the second sequence is 0, representing that 256 bits of the first forward error correction mother code corresponding to the second sequence are not shortened. In this way, the change amount of the payload information of the forward error correction codeword information relative to the payload information of the first forward error correction mother code is indicated by using the bit sequence A1. After receiving the second information (that is, the bit sequence A1), the optical network unit 120 may shorten the payload information of the first forward error correction mother code based on the indication of the bit sequence, to obtain the payload information of the forward error correction codeword information configured for the optical network unit 120. In this case, the bit sequence A2 includes a third sequence (for example, the last column to the last third column), and a value corresponding to the third sequence is 0, representing that 256 bits of the first forward error correction mother code corresponding to the third sequence are punctured. In this case, the bit sequence A2 further includes a fourth sequence (for example, the last fourth column to the last 12th column), and a value corresponding to the fourth sequence is 1, representing that 256 bits of the first forward error correction mother code corresponding to the fourth sequence are not punctured. In this way, the change amount of the parity bit information of the forward error correction codeword information relative to the parity bit information of the first forward error correction mother code is indicated by using the bit sequence A2. After receiving the third information (that is, the bit sequence A2), the optical network unit 120 may puncture the parity bit information of the first forward error correction mother code based on the indication of the bit sequence, to obtain the parity bit information of the forward error correction codeword information configured for the optical network unit 120.

Correspondingly, for example, the forward error correction codeword information is represented by a bit sequence B. A half column of the mother code matrix corresponds to 128 bits of codeword information, and corresponds to one bit of the bit sequence B. The bit sequence B includes a bit sequence B1 and a bit sequence B2. Different from the foregoing bit sequence A, the bit sequence B includes 69*2=138 bits, the bit sequence B1 includes 57*2=114 bits, and the bit sequence B2 includes 12*2=24 bits. For other descriptions, refer to the foregoing descriptions of the bit sequence A. Details are not described herein again.

It should be understood that, in this embodiment of this application, setting a value corresponding to a sequence to 0 may represent that 256 or 128 bits of the first forward error correction mother code corresponding to the sequence are shortened or punctured, or setting a value corresponding to a sequence to 1 may represent that 256 or 128 bits of the first forward error correction mother code corresponding to the sequence are shortened or punctured. This is not limited in this application.

In this case, when a half column is used as a unit, the bit sequence includes 69*2=138 bits at most, in other words, 18 bytes (144 bits) may be used to complete indication. When a column is used as a unit, the bit sequence includes 69 bits at most, in other words, nine bytes (72 bits) may be used to complete indication. This helps reduce signaling overheads and save transmission resources.

Optionally, to ensure validity of a codeword, generally, not all columns are punctured and shortened, and only part of columns can be punctured or shortened. For example, a maximum of 32 columns can be shortened and 8 columns can be punctured. When a half column is used as a unit, the bit sequence includes (32+8)*2=80 bits at most, in other words, 10 bytes (80 bits) may be used to complete indication. When a column is used as a unit, the bit sequence includes 32+8=40 bits at most, in other words, five bytes (40 bits) may be used to complete indication, so that signaling overheads can be further reduced, and transmission resources can be saved.

Optionally, a priority order of shortening may be that shortening starts from the last column. For example, if three columns are shortened, shortening starts from the 57th column. To be specific, the 57th column, the 56th column, and the 55th column are successively shortened. During puncturing, puncturing may be performed based on a priority order of the 59th column, the 60th column, the 61st column, the 62nd column, the 67th column, and so on.

According to the technical solution described in Case 1, specific forward error correction codeword information is represented by the bit sequence. The first forward error correction mother code may be processed in a unit of one column or a half column of an encoded matrix to obtain the forward error correction codeword information, to help implement flexible configuration of the forward error correction codeword information.

Case 2:

A payload part and a parity bit part of the forward error correction codeword information are indicated by using the value.

Further, the foregoing first information may include both a first value and a second value, and the first value indicates that M bits of payload information of the first forward error correction mother code are shortened based on a first order, to obtain the payload information of the forward error correction codeword information. The second value indicates that N bits of parity bit information of the first forward error correction mother code are punctured based on a second order, to obtain parity bit information of the forward error correction codeword information. M is obtained by multiplying the first value by 256 or 128, and N is obtained by multiplying the second value by 256 or 128.

By way of example but not limitation, when the first information is carried in the PLOAM message, a specific form of the first information may be shown in the following Table 5. "FEC capability set" in bold represents that the message is the forward error correction codeword information configured for the optical network unit 120. "Shortened columns number" in bold represents the first value. "Punctured columns number" in bold represents the second value.

TABLE 5

Form and content of first information in Case 2

| Octet | Content | Description |
|---|---|---|
| 1-2 | ONU-ID | ONU-ID of the message sender. |
| 3 | Message type ID | 0x1F, "Set_FEC_Code". |
| 4 | SeqNo | Eight-bit unicast sequence number. |
| 5 | FEC capability set | An octet of the form RRRR RRRS, where: S = 1: Setting FEC code for upstream transmission |
| 6 | Shortened columns number | Numbers of half column shortened from the back of mother code. |
| 7 | Punctured columns number | Numbers of half column punctured from the back of mother code. |
| 8-40 | padding | Set to 0x00 by the transmitter; treated as "don't care" by the receiver. |
| 41-48 | MIC | Message integrity check, computed using the default PLOAM_IK in case of broadcast message, and using the ONU-specific derived shared PLOAM_IK in case of directed message. |

Figure 5:
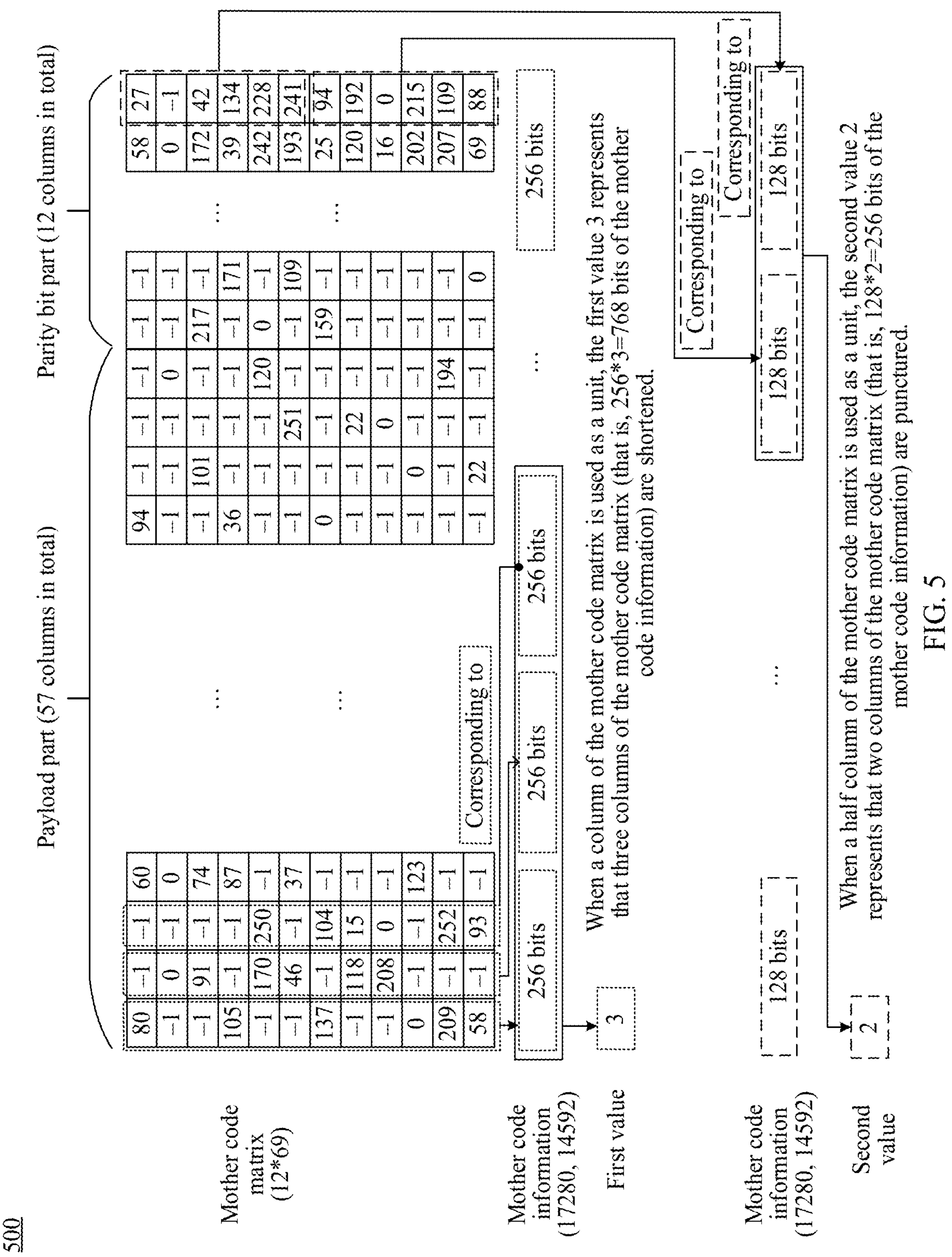
FIG. 5 is a schematic diagram of indicating forward error correction codeword information by using a value according to an embodiment of this application.

As shown in FIG. 5, a 12*69 mother code matrix has 69 columns in total, where 57 columns are the payload information, and 12 columns are the parity bit information.

In a possible implementation, one column of the mother code matrix corresponds to 256 bits of codeword information, and corresponds to one bit of the first value. When the first value is 3 and a first order is from back to front, it represents that M bits of the payload information of the first forward error correction mother code are shortened from back to front, to obtain the payload information of the forward error correction codeword information. M is obtained by multiplying the first value by 256, that is, M=3*256-768. In this way, after receiving the first value, the optical network unit 120 may process the payload information of the first forward error correction mother code, to obtain the payload information of the forward error correction codeword information.

When the second value is 2 and a second order is from back to front, it represents that N bits of the parity bit information of the first forward error correction mother code are punctured from back to front, to obtain the parity bit information of the forward error correction codeword information. N is obtained by multiplying the second value by 256, that is, N=2*256=512. In this way, after receiving the second value, the optical network unit 120 may process the parity bit information of the first forward error correction mother code, to obtain the parity bit information of the forward error correction codeword information.

In another possible implementation, a half column of the mother code matrix corresponds to 128 bits of codeword information, and corresponds to one bit of the first value. When the first value is 3 and a first order is from back to front, it represents that M bits of the payload information of the first forward error correction mother code are shortened from back to front, to obtain the payload information of the forward error correction codeword information. M is obtained by multiplying the first value by 128, that is, M=3*128=384. In this way, after receiving the first value, the optical network unit 120 may process the payload information of the first forward error correction mother code, to obtain the payload information of the forward error correction codeword information. When the second value is 2 and a second order is from back to front, it represents that N bits of the parity bit information of the first forward error correction mother code are punctured from back to front, to obtain the parity bit information of the forward error correction codeword information. N is obtained by multiplying the second value by 128, that is, N=2*128=256. In this way, after receiving the second value, the optical network unit 120 may process the parity bit information of the first forward error correction mother code, to obtain the parity bit information of the forward error correction codeword information.

It should be understood that, in this embodiment of this application, the first order and/or the second order may be back-to-front or front-to-back. The first order may be the same as or different from the second order. Optionally, the first order and/or the second order may alternatively be orders/an order specified through negotiation or according to a protocol, for example, starting from a middle column. This is not limited in this application. The first order and/or the second order may be consecutive. For example, when the first value is 3, three consecutive columns (or half columns) are processed. Optionally, the first order and/or the second order may alternatively be inconsecutive. For example, when the first value is 3, columns may be processed based on an order specified through negotiation or according to a protocol, for example, an order of an odd-numbered column or an even-numbered column. This is not limited in this application.

Optionally, a priority order of shortening may be that shortening starts from the last column. For example, if three columns are shortened, shortening starts from the 57th column. To be specific, the 57th column, the 56th column, and the 55th column are successively shortened. During puncturing, puncturing may be performed based on a priority order of the 59th column, the 60th column, the 61st column, the 62nd column, the 67th column, and so on.

In this case, when a half column is used as a unit, the payload part has 57*2 possibilities in total, and the parity bit has 12*2 possibilities in total. The payload part is represented by using at least seven bits, and the parity bit is represented by using five bits. This helps reduce signaling overheads and save transmission resources.

Optionally, to ensure validity of a codeword, generally, not all columns are punctured and shortened, and only part of columns can be punctured or shortened. For example, a maximum of 32 columns can be shortened and 8 columns can be punctured. When a half column is used as a unit, only six bits may be needed to represent the payload part, and four bits may be needed to represent the parity part, so that signaling overheads can be further reduced, and transmission resources can be saved.

According to the technical solution described in Case 2, the value represents that the mother code matrix corresponding to the first forward error correction mother code is processed to obtain specific forward error correction codeword information, to help implement flexible configuration of the forward error correction codeword information.

Case 3:

A payload part of the forward error correction codeword information is indicated by using the bit sequence. A parity bit part of the forward error correction codeword information is indicated by using the value.

Further, the foregoing first information may include both second information and a second value. The second information indicates, by using the bit sequence, a change amount of the payload information of the forward error correction codeword information relative to payload information of the first forward error correction mother code. The second value indicates that N bits of parity bit information of the first forward error correction mother code are punctured based on a second order, to obtain parity bit information of the forward error correction codeword information. N is obtained by multiplying the second value by 256 or 128. For example, the second information includes a bit sequence A1. When a half column is used as a unit, the bit sequence A1 includes 57*2=114 bits. In this case, the parity bit part may be indicated by using five bits in a value representation manner.

It should be understood that, for specific representation manners and beneficial effects of the second information and the second value, refer to the descriptions in the foregoing Case 1 and Case 2. Details are not described herein again.

According to the technical solution described in Case 3, the payload information of the forward error correction codeword information is represented by the bit sequence, and the parity bit information of the forward error correction codeword information is represented by the value. The first forward error correction mother code may be processed in a unit of one column or a half column of an encoded matrix to obtain the forward error correction codeword information, to help implement flexible configuration of the forward error correction codeword information.

Case 4:

A payload part of the forward error correction codeword information is indicated by using the value. A parity bit part of the forward error correction codeword information is indicated by using the bit sequence.

Further, the first information may include both third information and a first value. The first value indicates that M bits of payload information of the first forward error correction mother code are shortened based on a first order, to obtain the payload information of the forward error correction codeword information. M is obtained by multiplying the first value by 256 or 128. The third information indicates, by using the bit sequence, a change amount of parity bit information of the forward error correction codeword information relative to parity bit information of the first forward error correction mother code. For example, when a column is used as a unit, the payload part is represented by using seven bits, the third information includes a bit sequence A2, and the bit sequence A2 includes 12 bits.

It should be understood that, for specific representation manners and beneficial effects of the third information and the first value, refer to the descriptions in the foregoing Case 1 and Case 2. Details are not described herein again.

According to the technical solution described in Case 4, the payload information of the forward error correction codeword information is represented by the value, and the parity bit information of the forward error correction codeword information is represented by the bit sequence. The first forward error correction mother code may be processed in a unit of one column or a half column of an encoded matrix to obtain the forward error correction codeword information, to help implement flexible configuration of the forward error correction codeword information.

S340: The optical line termination 110 sends the first information to the optical network unit 120.

The first information is carried in the first message. The first message includes at least one of the following: the PLOAM message, the OMCI message, and the OAM message.

S350: The optical network unit 120 determines the forward error correction codeword information based on the first information.

Further, corresponding to the descriptions in S330, the optical network unit 120 processes the first forward error correction mother code in a unit of one column or a half column of the encoded matrix based on the content of the first information and the bit sequence and/or the value, to obtain the forward error correction codeword information.

According to the technical solution provided in this application, the change amount of the forward error correction codeword information relative to the first forward error correction mother code is indicated, to help implement flexible configuration of the forward error correction codeword information.

It should be understood that sequence numbers of the foregoing processes do not mean execution orders. The execution orders of the processes should be determined based on functions and internal logic of the processes, and should not be construed as any limitation on implementation processes of embodiments of this application.

It should be further understood that, in embodiments of this application, unless otherwise stated or a logical conflict occurs, terms and/or descriptions in different embodiments are consistent and may be mutually referenced, and technical features in different embodiments may be combined based on an internal logical relationship thereof, to form a new embodiment.

It may be understood that, in the foregoing embodiments of this application, the method implemented by a communication device may alternatively be implemented by a component (for example, a chip or a circuit) that can be configured inside the communication device.

The encoding configuration method provided in embodiments of this application is described in detail above with reference to FIG. 2, FIG. 3, FIG. 4, and FIG. 5. The foregoing encoding configuration method is mainly described from the perspective of interaction between network elements. It may be understood that to implement the foregoing functions, each apparatus includes a corresponding hardware structure and/or software module for performing each function. A person skilled in the art should be aware that, in combination with units and algorithm steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
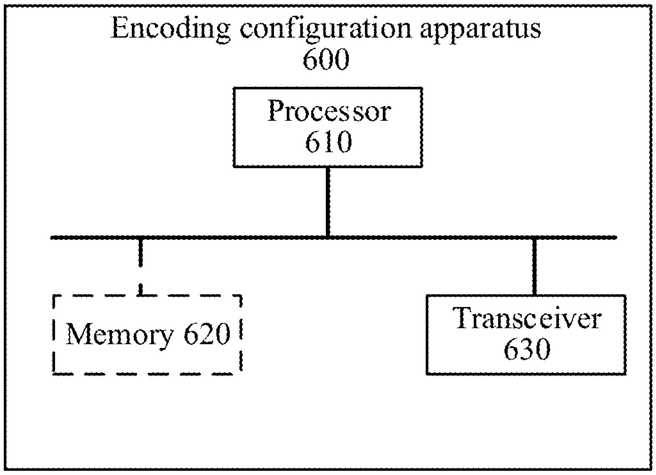
FIG. 6 is a schematic diagram of an encoding configuration device according to an embodiment of this application.
Figure 7:
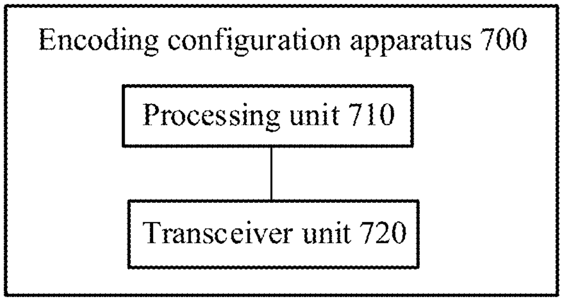
FIG. 7 is a schematic diagram of an encoding configuration apparatus according to an embodiment of this application.

The following describes in detail an encoding configuration apparatus provided in embodiments of this application with reference to FIG. 6 and FIG. 7. It should be understood that descriptions of the apparatus embodiments correspond to descriptions of the method embodiments. Therefore, for content that is not described in detail, refer to the foregoing method embodiments. For brevity, a part of content is not described herein again.

In embodiments of this application, a transmit end device or a receive end device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. An example in which each functional module is obtained through division based on each corresponding function is used below for description.

FIG. 6 is a schematic diagram of a structure of an example of an encoding configuration apparatus according to this application. Any device involved in any one of the foregoing methods 200 to 400, such as an optical line termination and an optical network unit, may be implemented by the encoding configuration apparatus shown in FIG. 6.

It should be understood that the encoding configuration apparatus 600 may be an entity device, or may be a component (for example, an integrated circuit or a chip) of an entity device, or may be a functional module in an entity device.

As shown in FIG. 6, the encoding configuration apparatus 600 includes one or more processors 610. The processor 610 may store execution instructions for performing the method in embodiments of this application. Optionally, the processor 610 may invoke an interface to implement receiving and sending functions. The interface may be a logical interface or a physical interface, which is not limited. For example, the interface may be a transceiver circuit or an interface circuit. The transceiver circuit or the interface circuit configured to implement the receiving and sending functions may be separated or may be integrated together. The transceiver circuit or the interface circuit may be configured to read and write code/data, or the transceiver circuit or the interface circuit may be configured to transmit or transfer a signal.

Optionally, the interface may be implemented by a transceiver. Optionally, the encoding configuration apparatus 600 may further include a transceiver 630. The transceiver 630 may be referred to as a transceiver unit, a transceiver machine, a transceiver circuit, or a transceiver, and is configured to implement receiving and sending functions.

Optionally, the encoding configuration apparatus 600 may further include a memory 620. A specific deployment location of the memory 620 is not specifically limited in this embodiment of this application. The memory may be integrated into the processor, or may be independent of the processor. In a case in which the encoding configuration apparatus 600 does not include the memory, the encoding configuration apparatus 600 may only need to have a processing function, and the memory may be deployed at another location (for example, a cloud system).

The processor 610, the memory 620, and the transceiver 630 communicate with each other through an internal connection path, to transfer a control signal and/or a data signal.

It may be understood that, although not shown, the encoding configuration apparatus 600 may further include another apparatus, such as an input apparatus, an output apparatus, or a battery.

Optionally, in some embodiments, the memory 620 may store execution instructions for performing the method in embodiments of this application. The processor 610 may execute the instructions stored in the memory 620 and complete, in combination with other hardware (for example, the transceiver 630), the steps performed in the following method. For a specific working process and beneficial effects, refer to the descriptions in the foregoing method embodiments.

The method disclosed in embodiments of this application may be applied to the processor 610, or may be implemented by the processor 610. The processor 610 may be an integrated circuit chip and has a signal processing capability. In an implementation process, the steps of the method may be completed by using an integrated logic circuit of hardware in the processor or instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The methods, the steps, and logical block diagrams that are disclosed in embodiments of this application may be implemented or performed. The general-purpose processor may be a microprocessor, or the processor may be any processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a random-access memory (RAM), a flash memory, a read-only memory (ROM), a programmable read-only memory, an electrically erasable programmable memory, or a register. The storage medium is located in the memory, and the processor reads the instructions in the memory and completes the steps in the foregoing methods in combination with hardware of the processor.

It may be understood that the memory 620 may be a volatile memory or a non-volatile memory, or may include both a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM, and may serve as an external cache. By way of illustrative rather than limitative descriptions, many forms of RAMs are available, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct Rambus random-access memory (DR RAM). It should be noted that the memory in the systems and methods described in this specification includes but is not limited to these memories and any memory of another proper type.

FIG. 7 is a schematic diagram of a structure of an example of an encoding configuration apparatus according to this application.

Optionally, a specific form of the encoding configuration apparatus 700 may be a general-purpose computer device or a chip in a general-purpose computer device. This is not limited in this embodiment of this application. As shown in FIG. 7, the encoding configuration apparatus includes a processing unit 710 and a transceiver unit 720.

Further, the encoding configuration apparatus 700 may be any apparatus in this application, and may implement a function that can be implemented by the apparatus. It should be understood that the encoding configuration apparatus 700 may be an entity device, or may be a component (for example, an integrated circuit or a chip) of an entity device, or may be a functional module in an entity device.

In a possible design, the encoding configuration apparatus 700 may be the optical line termination in the foregoing method embodiments, or may be a chip configured to implement a function of the optical line termination in the foregoing method embodiments.

For example, the processing unit 710 is configured to determine first information, where the first information indicates a change amount of forward error correction codeword information relative to first forward error correction mother code; and the transceiver unit 720 is configured to send the first information to an optical network unit.

Optionally, the transceiver unit 720 is further configured to receive capability reporting information, where the capability reporting information indicates forward error correction mother code supported by the optical network unit, and the forward error correction mother code supported by the optical network unit includes the first forward error correction mother code.

Optionally, the transceiver unit 720 is further configured to send capability query information, where the capability query information is used to query the forward error correction mother code supported by the optical network unit.

It should be further understood that when the encoding configuration apparatus 700 is an optical line termination device, the transceiver unit 720 in the encoding configuration apparatus 700 may be implemented by using a communication interface (for example, a transceiver or an input/output interface), and the processing unit 710 in the encoding configuration apparatus 700 may be implemented by using at least one processor, for example, may correspond to the processor 610 shown in FIG. 6.

Optionally, the encoding configuration apparatus 700 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps is described in detail in the foregoing method embodiments. For brevity, details are not described herein.

In another possible design, the encoding configuration apparatus 700 may be the optical network unit apparatus in the foregoing method embodiments, or may be a chip configured to implement a function of the optical network unit in the foregoing method embodiments.

For example, the transceiver unit 720 is configured to receive first information, where the first information indicates a change amount of forward error correction codeword information relative to first forward error correction mother code; and the processing unit 710 is configured to determine the forward error correction codeword information based on the first information.

Optionally, the transceiver unit 720 is further configured to send capability reporting information, where the capability reporting information indicates forward error correction mother code supported by the optical network unit, and the forward error correction mother code supported by the optical network unit includes the first forward error correction mother code.

Optionally, the transceiver unit 720 is further configured to receive capability query information, where the capability query information is used to query the forward error correction mother code supported by the optical network unit.

It should be further understood that when the encoding configuration apparatus 700 is an optical network unit apparatus, the transceiver unit 720 in the encoding configuration apparatus 700 may be implemented by using a communication interface (for example, a transceiver or an input/output interface), for example, may correspond to the transceiver 630 shown in FIG. 6, and the processing unit 710 in the encoding configuration apparatus 700 may be implemented by using at least one processor, for example, may correspond to the processor 610 shown in FIG. 6.

Optionally, the encoding configuration apparatus 700 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps is described in detail in the foregoing method embodiments. For brevity, details are not described herein.

It should be further understood that the apparatus 700 may be further configured to implement functions of the optical line termination and the optical network unit in the foregoing method embodiments. The transceiver unit 720 may be configured to implement operations related to receiving and sending, and the processing unit 710 may be configured to implement another operation except the receiving and sending. For details, refer to the descriptions in the foregoing method embodiments, and details are not listed herein again.

In addition, in this application, the encoding configuration apparatus 700 is presented in a form of a functional module. The "module" herein may be an application-specific integrated circuit ASIC, a circuit, a processor and a memory that execute one or more software or firmware programs, an integrated logic circuit, and/or another device that can provide the foregoing functions. In a simple embodiment, a person skilled in the art may figure out that the apparatus 700 may be in a form shown in FIG. 7. The processing unit 710 may be implemented by using the processor 610 shown in FIG. 6. Optionally, if encoding configuration apparatus shown in FIG. 6 includes the memory 620, the processing unit 710 may be implemented by using the processor 610 and the memory 620. The transceiver unit 720 may be implemented by using the transceiver 630 shown in FIG. 6. The transceiver 630 includes a receiving function and a sending function. Further, the processor is implemented by executing a computer program stored in the memory. Optionally, when the apparatus 700 is a chip, a function and/or an implementation process of the transceiver unit 720 may be alternatively implemented by using a pin, a circuit, or the like. Optionally, the memory may be a storage unit in the chip, such as a register or a cache. The storage unit may be a storage unit that is in the computer device and that is located outside the chip, for example, the memory 620 shown in FIG. 6, or may be a storage unit that is deployed in another system or device but not located in the computer device.

Aspects or features of this application may be implemented as a method, an apparatus, or a product that uses standard programming and/or engineering technologies. The term "product" used in this application covers a computer program that can be accessed from any computer-readable device, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an EPROM, a card, a stick, or a key drive). In addition, various storage media described in this specification may represent one or more devices and/or another machine-readable medium that are configured to store information. The term "machine-readable medium" may include but is not limited to a radio channel, and various other media that can store, contain and/or carry instructions and/or data.

According to the methods provided in embodiments of this application, this application further provides a computer program product. The computer program product includes computer program code. When the computer program code is run on a computer, the computer is enabled to perform the method according to any embodiment shown in FIG. 2 or FIG. 3.

According to the methods provided in embodiments of this application, this application further provides a computer-readable medium. The computer-readable medium stores program code. When the program code is run on a computer, the computer is enabled to perform the method according to any embodiment shown in FIG. 2 or FIG. 3.

According to the methods provided in embodiments of this application, this application further provides a system, including the foregoing apparatus or device.

All or a part of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density DVD), a semiconductor medium (for example, a solid-state disc (SSD)), or the like.

The terms such as "component", "module", and "system" used in this specification are used to represent computer-related entities, hardware, firmware, combinations of hardware and software, software, or software being executed. For example, a component may be, but is not limited to, a process that is run on a processor, a processor, an object, an executable file, an execution thread, a program, and/or a computer. As illustrated by using figures, both an application that is run on a computing device and the computing device may be components. One or more components may reside within the process and/or the execution thread, and the component may be located on one computer and/or distributed between two or more computers. In addition, these components may be executed from various computer-readable media that store various data structures. The component may, for example, perform communication by using a local and/or remote process and based on a signal having one or more data packets (for example, data from two components interacting with another component in a local system, a distributed system, and/or across a network such as the Internet interacting with another system by using the signal).

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally represents an "or" relationship between the associated objects.

It should be further understood that numbers "first", "second", and the like introduced in embodiments of this application are merely intended to distinguish between different objects, for example, distinguish between different "information", "devices", or "units". Understanding of a specific object and a correspondence between different objects should be determined based on functions and internal logic of the objects, and should not be construed as any limitation on an implementation process of embodiments of this application.

It may be clearly understood by a person skilled in the art that, for a purpose of convenient and brief descriptions, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method applied to an optical network unit and comprising:

receiving capability query information that queries a forward error correction capability supported by the optical network unit;

sending, in response to the capability query information, capability reporting information that indicates whether the optical network unit supports shortening of a low-density parity check (LDPC) forward error correction mother code, wherein the capability reporting information indicates the optical network unit supports shortening of the LDPC forward error correction mother code; and receiving first information, wherein forward error correction codeword information is based on the first information, and wherein the first information indicates a change amount of the forward error correction codeword information relative to the LDPC forward error correction mother code.

2. The method according to claim 1, wherein the first information comprises a first value indicating that M bits of payload information of the LDPC forward error correction mother code are shortened based on a first order in order to obtain the payload information of the forward error correction codeword information, and wherein M is the first value multiplied by 256 or 128.

3. The method according to claim 2, wherein the first order is back-to-front or front-to-back.

4. The method according to claim 1, wherein the first information further comprises fourth information, and wherein the fourth information indicates that the first information takes effect by shortening of the LDPC forward error correction mother code.

5. The method according to claim 1, further comprising sending a first message, wherein the first message comprises the first information, and wherein the first message comprises at least one of a physical layer operations, administration and maintenance (PLOAM) message, an optical network terminal management and control interface (OMCI) message, or an operations, administration and maintenance (OAM) message.

6. A method applied to an optical line termination and comprising:

sending capability query information that queries a forward error correction capability supported by an optical network unit;

receiving, in response to the capability query information, capability reporting information that indicates whether the optical network unit supports shortening of a low-density parity check (LDPC) forward error correction mother code, wherein the capability reporting information indicates the optical network unit supports shortening of the LDPC forward error correction mother code; and sending first information to the optical network unit, wherein the first information indicates a change amount of forward error correction codeword information relative to the LDPC forward error correction mother code.

7. The method according to claim 6, wherein the first information comprises a first value indicating that M bits of payload information of the LDPC forward error correction mother code are shortened based on a first order in order to obtain the payload information of the forward error correction codeword information, and wherein M is the first value multiplied by 256 or 128.

8. The method according to claim 7, wherein the first order is back-to-front or front-to-back.

9. The method according to claim 6, wherein the first information further comprises fourth information, and wherein the fourth information indicates that the first information takes effect by shortening of the LDPC forward error correction mother code.

10. The method according to claim 6, further comprising receiving a first message, wherein the first message comprises the first information, and wherein the first message comprises at least one of: a physical layer operations, administration and maintenance (PLOAM) message, an optical network terminal management and control interface (OMCI) message, or an operations, administration and maintenance (OAM) message.

11. An optical network unit comprising:

a memory configured to store executable instructions; and one or more processors coupled to the memory and configured to execute the instructions to cause the optical network unit to:

receive capability query information that queries a forward error correction capability supported by the optical network unit;

send, in response to the capability query information, capability reporting information that indicates whether the optical network unit supports shortening of a low-density parity check (LDPC) forward error correction mother code, wherein the capability reporting information indicates the optical network unit supports shortening of the LDPC forward error correction mother code; and receive first information, wherein forward error correction codeword information is based on the first information, and wherein the first information indicates a change amount of the forward error correction codeword information relative to the LDPC forward error correction mother code.

12. The optical network unit according to claim 11, wherein the first information comprises a first value indicating that M bits of payload information of the LDPC forward error correction mother code are shortened based on a first order in order to obtain the payload information of the forward error correction codeword information, and wherein M is the first value multiplied by 256 or 128.

13. The optical network unit according to claim 12, wherein the first order is back-to-front or front-to-back.

14. An optical line termination comprising:

a memory configured to store executable instructions; and one or more processors coupled to the memory and configured to execute the instructions to cause the optical line termination to:

send capability query information that queries a forward error correction capability supported by an optical network unit;

receive, in response to the capability query information, capability reporting information that indicates whether the optical network unit supports shortening of a low-density parity check (LDPC) forward error correction mother code, wherein the capability reporting information indicates the optical network unit supports shortening of the LDPC forward error correction mother code; and send first information to the optical network unit, wherein the first information indicates a change amount of forward error correction codeword information relative to the LDPC forward error correction mother code.

15. The optical line termination according to claim 14, wherein the first information comprises a first value indicating that M bits of payload information of the LDPC forward error correction mother code are shortened based on a first order to obtain the payload information of the forward error correction codeword information, and wherein M is the first value multiplied by 256 or 128.

16. The optical line termination according to claim 15, wherein the first information further comprises fourth information, and wherein the fourth information indicates that the first information takes effect by shortening of the LDPC forward error correction mother code.

* * * * *